No. 670,711. Patented Mar. 26, 1901.
A. KOEPSEL.
COHERER FOR DETECTING ELECTRIC WAVES.
(Application filed Aug. 25, 1900.)
(No Model.)
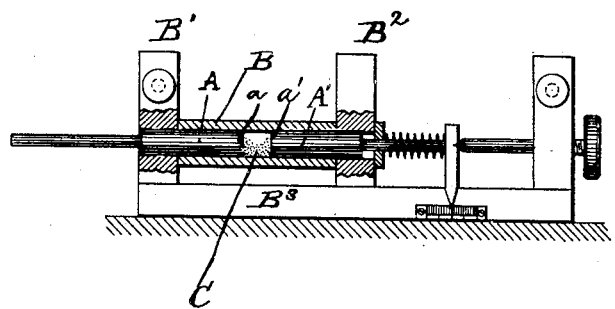
WITNESSES:
M. C. Massie.
Anton A. Gloetzner.
by ATTORNEY
INVENTOR
Adolf Koepsel,

United States Patent Office.

ADOLF KOEPSEL, OF CHARLOTTENBURG, GERMANY.

COHERER FOR DETECTING ELECTRIC WAVES.

SPECIFICATION forming part of Letters Patent No. 670,711, dated March 26, 1901.

Application filed August 25, 1900. Serial No. 28,076. (No model.)

*To all whom it may concern:*

Be it known that I, ADOLF KOEPSEL, a subject of the German Emperor, residing at Charlottenburg, near Berlin, Germany, have invented a certain new and useful Improvement in Coherers for Detecting Electric Waves; and I do hereby declare the following to be a full, clear, and exact description of the invention, such as will enable others skilled in the art to which it appertains to make and use the same.

My invention relates to an improvement in coherers. This improvement depends on the newly-discovered fact that accuracy in breaking contact in such coherers is greater the harder the metal used. Furthermore, it has been established that this function of the metal depends even in a higher degree on the hardness of the electrodes, together with their corresponding capacity for being highly polished than on the hardness of the metal filings used.

My invention consists in the employment of a pair of electrodes having their effective or acting surfaces made of hardened steel or hardened cast-iron, between which electrodes is located a suitable amount of metallic filings in contact with both electrodes.

The invention will first be described in connection with the accompanying drawing and then particularly pointed out in the claims.

The drawing is a sectional view, partly in elevation, of a coherer embodying my invention.

Referring to the drawing, A A' are two electrodes made of steel or cast-iron and hardened either wholly or in part, and in either case the hardened part including the effective or acting faces $a\ a'$ of the electrodes. The said electrodes are inserted in a suitable tube or receptacle—as, for example that shown at B— held between two standards B' B², which are secured to a suitable base B³, the standards being provided with openings in line with the tube, into which openings the electrodes extend. Between the effective or acting faces of the electrodes are placed any suitable metallic filings, as indicated at C.

With my improved hardened electrodes it is preferable to employ steel filings; but filings of silver and other soft metal may be used in combination with hardened electrodes with results unattainable by any coherer hitherto known.

The manner of inserting the coherer in the circuits need not be described, since this may be done in any usual way.

Having thus fully described my invention, what I claim is—

1. In a coherer, the combination, with a pair of electrodes having hardened metallic acting faces, of metallic comminuted material located between said electrodes and in contact with their acting faces.

2. In a coherer, the combination, with a pair of electrodes having their acting faces made of hardened steel or iron, of metallic comminuted material located between said electrodes and in contact with their acting faces.

3. In a coherer, the combination with a pair of electrodes made of hardened steel or iron, of metallic comminuted material located between said electrodes and in contact with their acting faces.

In testimony whereof I have affixed my signature in presence of two witnesses.

ADOLF KOEPSEL.

Witnesses:
  WOLDEMAR HAUPT,
  HENRY HASPER.